(12) United States Patent
Muschaweck

(10) Patent No.: US 10,788,611 B2
(45) Date of Patent: Sep. 29, 2020

(54) HEADLIGHT

(71) Applicant: ARNOLD & RICHTER CINE TECHNIK GMBH & CO. BETRIEBS KG, Munich (DE)

(72) Inventor: Julius Muschaweck, Gauting (DE)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 0 days.

(21) Appl. No.: 16/324,517

(22) PCT Filed: Aug. 9, 2017

(86) PCT No.: PCT/EP2017/070146
§ 371 (c)(1),
(2) Date: Feb. 8, 2019

(87) PCT Pub. No.: WO2018/029234
PCT Pub. Date: Feb. 15, 2018

(65) Prior Publication Data
US 2019/0179072 A1    Jun. 13, 2019

(30) Foreign Application Priority Data

Aug. 9, 2016  (DE) .................. 10 2016 114 694

(51) Int. Cl.
| | |
|---|---|
| *F21V 7/04* | (2006.01) |
| *F21V 8/00* | (2006.01) |
| *F21Y 103/33* | (2016.01) |
| *F21W 131/406* | (2006.01) |

(52) U.S. Cl.
CPC ..... *G02B 6/0008* (2013.01); *F21W 2131/406* (2013.01); *F21Y 2103/33* (2016.08)

(58) Field of Classification Search
CPC .............. G02B 6/0008; F21Y 2103/33; F21Y 2131/406
(Continued)

(56) References Cited

U.S. PATENT DOCUMENTS 5,438,485 A * 8/1995 Li .................. B60Q 1/0011
                                                          362/558
8,876,344 B2 * 11/2014 Kishimoto .............. F21S 41/16
                                                          362/516
(Continued)

FOREIGN PATENT DOCUMENTS

| CN | 101208556 A | 6/2008 |
|---|---|---|
| CN | 103148365 A | 6/2013 |

(Continued)

OTHER PUBLICATIONS

EP Office Action in Application No. 17 751 080.7 dated Apr. 29, 2020.
(Continued)

*Primary Examiner* — Ali Alavi
(74) *Attorney, Agent, or Firm* — Maschoff Brennan

(57) ABSTRACT

A spotlight (1) is described for illuminating a film, studio, stage, event, and/or theatre environment. The spotlight comprises: a reflector arrangement (11) having a reflective inner surface (113), which delimits a reflector interior (114); a number of passive light guides (12) having feed points (121), which are arranged outside the reflector interior (114), and having light output points (122), which are arranged inside the reflector interior (114).

20 Claims, 16 Drawing Sheets

(58) Field of Classification Search
USPC .......................................................... 362/555
See application file for complete search history.

(56) References Cited

U.S. PATENT DOCUMENTS

| | | | |
|---|---|---|---|
| 9,587,818 B2 | 3/2017 | Kim et al. | |
| 10,324,247 B2 * | 6/2019 | Hikmet | G02B 27/1006 |
| 2008/0210953 A1 * | 9/2008 | Ladstatter | G02B 6/0008 257/88 |
| 2013/0148346 A1 | 6/2013 | Sun et al. | |
| 2014/0001507 A1 | 1/2014 | Streppel et al. | |
| 2016/0076753 A1 | 3/2016 | Kim et al. | |
| 2017/0167712 A1 | 6/2017 | Melzner | |

FOREIGN PATENT DOCUMENTS

| | | |
|---|---|---|
| CN | 103429952 A | 12/2013 |
| CN | 105423139 A | 3/2016 |
| DE | 10 2011 079 741 A1 | 1/2013 |
| DE | 102011114196 A1 | 3/2013 |
| DE | 10 2015 011 992 A1 | 3/2016 |
| DE | 10 2015 011992 A1 | 3/2016 |
| EP | 1 462 711 A1 | 9/2005 |
| EP | 2 320 125 A1 | 5/2011 |
| WO | 2007/000212 A2 | 1/2007 |
| WO | 2012/024607 A2 | 2/2012 |
| WO | 2012/036541 A1 | 3/2012 |
| WO | 2012036541 A1 | 3/2012 |
| WO | 2013041273 A1 | 3/2013 |
| WO | 2016/009089 A1 | 1/2016 |
| WO | 2016009089 A1 | 1/2016 |

OTHER PUBLICATIONS

CN Office Action in Application No. 201780049099.6 dated Feb. 3, 2020.

* cited by examiner

Fig. 5
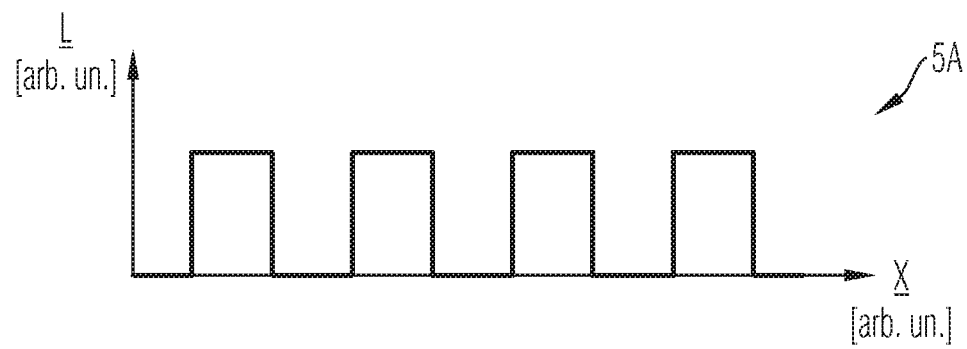
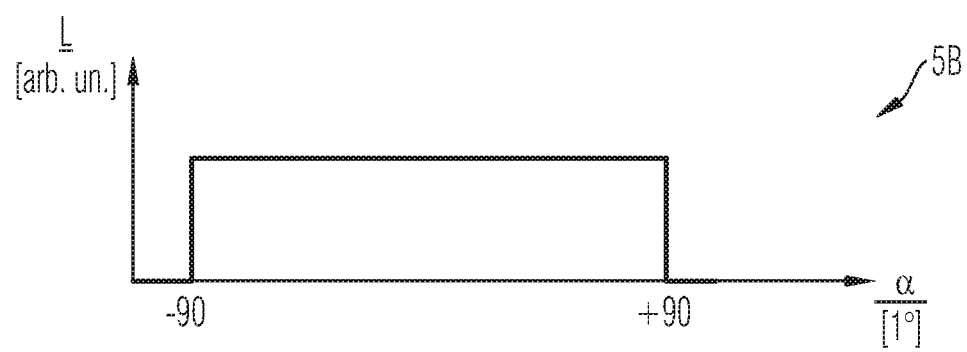
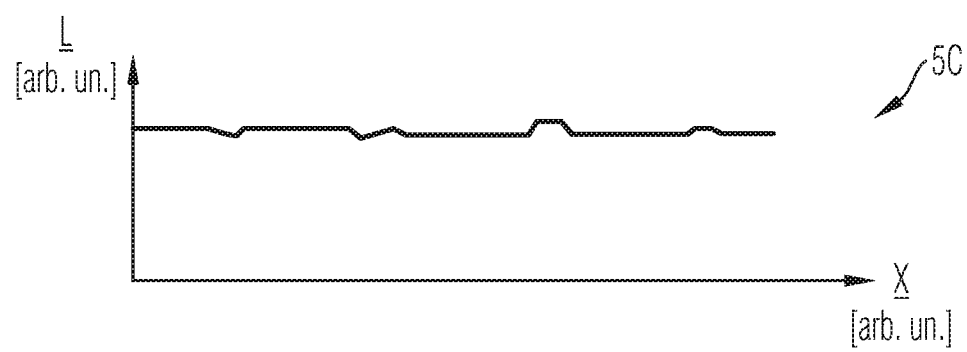
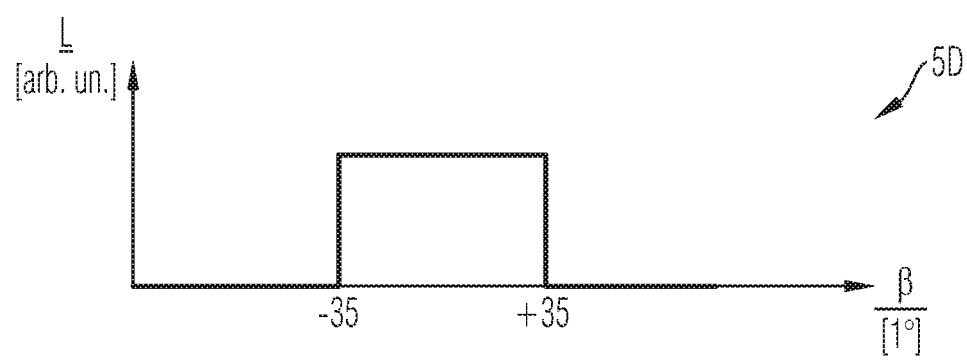

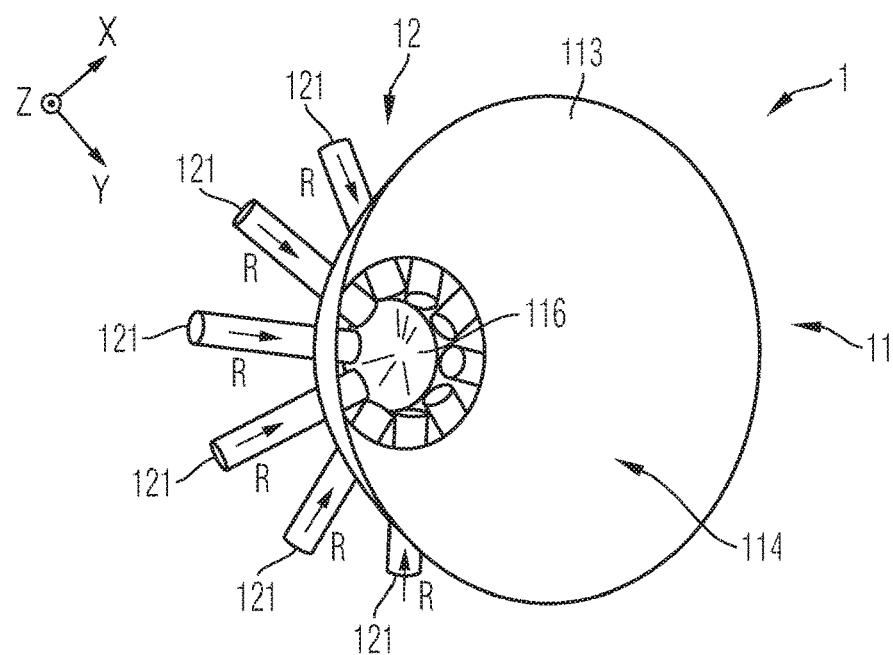
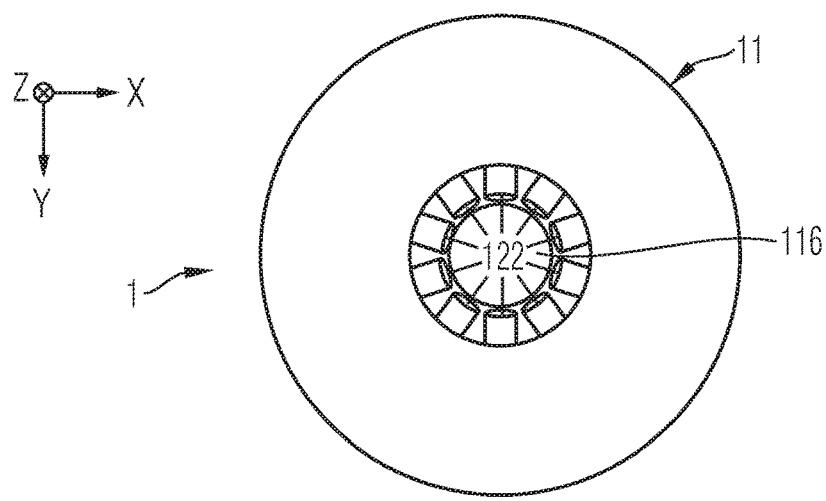
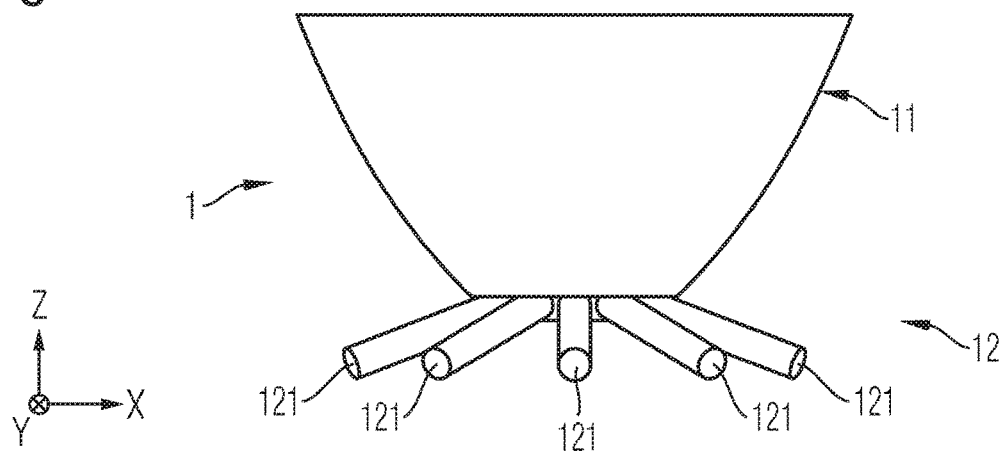

ary embodiments, if not

HEADLIGHT

TECHNICAL AREA

The present document relates to embodiments of a spotlight for illuminating a film, studio, stage, event, and/or theatre environment.

BACKGROUND

Spotlights are typically used for illuminating a film, studio, stage, event, and/or theatre environment. It is sometimes desirable for a spotlight comprising a light source arrangement to provide a sufficient light yield and meet further requirements, as are typical for a film, studio, stage, event, and/or theatre environment. Such requirements comprise, for example, continuous operation over multiple hours, a broad adjustment range of a scattering angle, a homogeneous light field which fades out softly, and/or a hard light source in a so-called flood setting and a soft light source in a so-called spot setting.

DESCRIPTION

According to a first embodiment, a spotlight for illuminating a film, studio, stage, event, and/or theatre environment comprises: a reflector arrangement having a reflective inner surface, which delimits a reflector interior; and a number of passive light guides having feed points, which are arranged outside the reflector interior, and having light output points, which are arranged inside the reflector interior. Each of the passive light guides can have, for example, in the light guiding direction, a longitudinal extension defined by a distance between the respective feed point and the respective light output point, which is at least multiple times greater than a transverse extension perpendicular to the light guiding direction.

For example, the spotlight comprises an electrically operated light source arrangement arranged outside the reflector interior, which is designed to generate light and feed it in at the feed points of the passive light guides.

The reflector arrangement can be a curved reflector. The reflector arrangement is sometimes also referred to hereafter simply as a "reflector".

Furthermore, the light guides can each be formed rod-shaped. The light guides can penetrate the inner surface of the reflector arrangement. For example, the passive light guides are arranged radially symmetrically and point in a star shape at the same point of the reflector interior. In one embodiment, the passive light guides are arranged along an imaginary circle and the longitudinal extensions are each oriented perpendicularly to the peripheral profile of the imaginary circle.

The number of passive light guides can be odd and the light guides can be arranged at a constant angle interval in relation to one another.

Moreover, it is within the scope of the invention that the light output points are arranged concentrically to the inner surface of the reflector arrangement.

The passive light guides can each have a polygonal cross section.

For example, the passive light guides are each formed from a glass material. Furthermore, the passive light guides can each be formed as total internal reflection light guides.

The reflective inner surface of the reflector arrangement can be formed in the manner of a truncated cone growing in diameter in the direction of the light exit or similar to a paraboloid.

In one embodiment, the light output points of the passive light guides are formed by an essentially flat light guide terminus surface, the surface normal of which is oriented at an angle of less than 30° in relation to the longitudinal extension of the respective light guide.

The reflector arrangement can additionally have a support, which forms or supports the reflective inner surface, wherein the light source arrangement is arranged completely outside the support.

A lens arrangement having at least two lens elements aligned concentrically to one another, which each have a wavy structure, can be arranged in the reflector interior. The lens element can be formed as diffusion lenses, and the wavy structure can be provided on the internal surfaces of the diffusion lenses. The lens arrangement can be designed to enlarge an emission angle of the spotlight.

Furthermore, a pre-reflector can be installed, which is arranged between the light output points of the passive light guides and the base of the reflector arrangement.

Further examples of possible embodiments of the spotlight now follow. The following features of the spotlight are all optional; however, they can be combined with one another to form further exemplary embodiments, if not described to the contrary.

The light source arrangement has a support, on the front side of which LEDs are arranged, which generate the light.

The LEDs or subgroups thereof are electrically connected to one another via a number of current paths.

The current paths are also arranged on the front side of the support.

The current paths each have a wedge-shaped profile, the tip of which points essentially into the centre of the front side.

The spotlight comprises LEDs having first LEDs of a first colour and second LEDs of a second colour, which are each installed on the front side of the support. The front side has a structure pattern, which is formed from a plurality of adjoining hexagonal cells of equal size. Each of the LEDs is arranged in a separate hexagonal cell.

The first LEDs and the second LEDs are each symmetrically distributed in relation to the centre point of the front side.

The structure pattern having the hexagonal cells completely fills up the front side and each of at least 90% of the hexagonal cells is occupied with a single one of the LEDs.

Each hexagonal cell has an area of less than 6 mm².

The geometrical centre point of the distribution of the first LEDs and the geometrical centre point of the distribution of the second LEDs are coincident with the centre point of the front side.

The support comprises a single-layer PCB, which is designed to supply an electrical current to every LED.

At least one first current path is provided in the support for the first LEDs. At least one second current path is provided in the support for the second LEDs. The at least one first current path and the at least one second current path do not intersect in any level of the support.

The spotlight comprises a liquid cooling unit coupled to the support, which is designed to dissipate waste heat produced by the LEDs.

The liquid cooling unit has: a supply line, which guides liquid toward a central point of a rear side of the support; and a drain line, which guides liquid away from the central point in the direction of a peripheral region of the support.

The spotlight furthermore comprises: a primary lens arrangement, which is positioned at a distance between 50

μm and 1 mm from the LEDs, wherein the primary lens arrangement comprises at least one lens element for each of the LEDs.

The lens elements of the primary lens arrangement are manufactured from pressed glass, plastic, or silicone.

The primary lens arrangement is designed in the form of a silicone-on-glass construction.

The primary lens arrangement is designed to output at least 70% of the light generated by the LEDs in a light cone having an aperture angle of less than 35°.

The lens elements are installed on the front side of a support of the primary lens arrangement facing away from the front side of the support, wherein the front side of the support has a structure pattern, which is formed from a plurality of adjoining hexagonal cells of equal size; each of the lens elements is arranged in a separate hexagonal cell.

The distance can be formed by an air gap.

Further features and advantages will be clear to a person skilled in the art in consideration of the study of the following detailed description and upon viewing the appended drawings.

BRIEF DESCRIPTION OF THE DRAWINGS

The parts shown in the figures are not necessarily to scale; rather, the emphasis is on the illustration of principles of the invention. Furthermore, identical reference signs in the figures identify parts corresponding to one another. In the figures:

FIG. 5 schematically shows a transfer function of a primary lens arrangement of a light source arrangement according to one or more embodiments on the basis of graphs;

FIG. 6 schematically shows a detail of a perspective view of a spotlight according to one or more embodiments;

FIG. 7 schematically shows a detail of a top view of a spotlight according to one or more embodiments;

FIG. 8 schematically shows a detail of a side view of a spotlight according to one or more embodiments;

DETAILED DESCRIPTION

Reference is made in the following detailed description to the appended drawings, which are associated therewith and in which specific embodiments are shown by the illustration of how the invention can be implemented in practice.

In this context, direction-specifying terminology, for example, "upper", "lower", "back", "front", "rear", "downstream", "upstream", etc. can be used with reference to the orientation of the figures which are described. Since parts of embodiments can be positioned in an array of different orientations, the direction-specifying terminology can be used for the purposes of illustration and is in no way restrictive. It is to be noted that other embodiments can be applied and structural or logical modifications can be carried out without deviating from the scope of protection of the present invention. The following detailed description is therefore not to be understood in a restrictive meaning, and the scope of protection of the present invention is defined by the appended claims.

Reference will now be made in detail to various embodiments, to one or more examples, which are illustrated in the figures. Each example is presented in an explanatory manner and is not to indicate a restriction of the invention. For example, illustrative features or features described as part of one embodiment can be applied to or in conjunction with other embodiments, to create a still further embodiment. The fact that the present invention comprises such modifications and variations is intentional. The examples are described using a specific language, which is not to be interpreted as restricting the scope of protection of the appended claims. The drawings are not to scale and merely to serve for illustration. For better comprehension, if not indicated otherwise, the same elements have been identified by the same references in the various drawings.

Figure 1A:
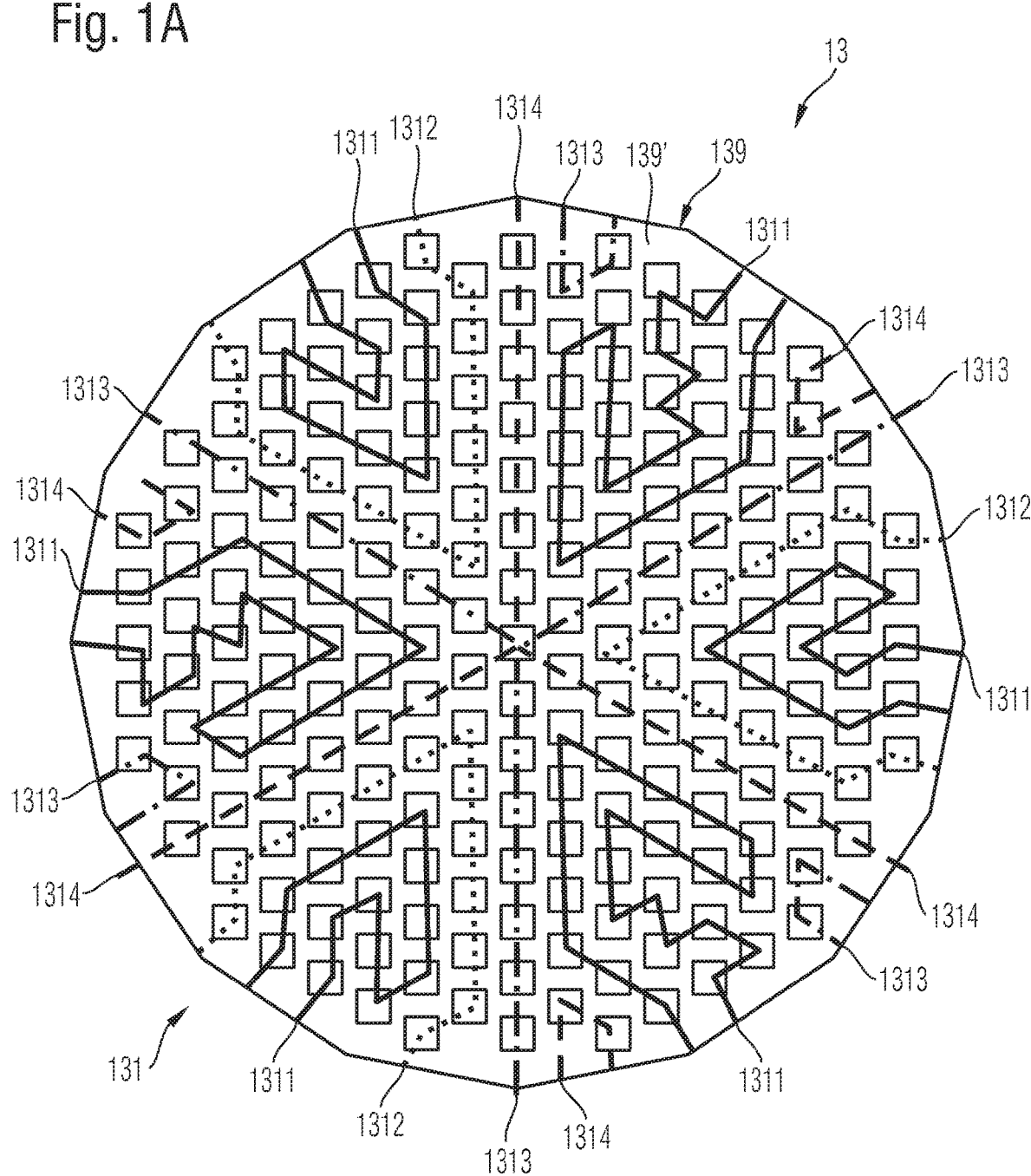
FIG. 1A schematically shows a detail of a top view of a light source arrangement according to one or more embodiments.

FIG. 1A shows a schematic view of a light source arrangement 13. As explained in greater detail at later points, the light source arrangement 13 can be designed for the purpose of being used to form a spotlight 1 for illuminating a film, studio, stage, event, and/or theatre environment.

The light source arrangement 13 can comprise a support 139, which has a front side 1391. For example, the front side 1391 has a polygonal peripheral profile, which can be nearly circular, for example. In other embodiments, other front side shapes can also be implemented, for example, a solely circular or a rectangular front side shape.

For example, the front side 1391 can have an area of at least 40 mm$^2$. The front side 1391 can be made planar, whereby said area can lie in one plane.

A plurality of LEDs 131 is installed on the front side 1391 of the support 139. All LEDs 131 can have identical dimensions and can have, for example, a footprint, for example, a light-emitting area of approximately 1 mm².

The LEDs 131 can comprise LEDs of a first colour, referred to hereafter as first LEDs 1311, LEDs of a second colour, referred to hereafter as second LEDs 1312, LEDs have a third colour, referred to hereafter as third LEDs 1313, and/or LEDs of a fourth colour, referred to hereafter as fourth LEDs 1314. For example, in one embodiment only first and second LEDs 1311, 1312 are provided, further embodiments can additionally comprise third LEDs 1313, and still further embodiments, as shown in FIG. 1A, can additionally comprise said fourth LEDs 1314. Further LEDs of colours other than the first colour, the second colour, the third colour, and the fourth colour can also be provided. Therefore, for example, five or six or even more colours could also be provided.

For example, the LEDs 131 are formed in their entirety to generate an RGB (red-green-blue) or an RGBW (red-green-blue-white) colour pattern.

In one exemplary embodiment, the first LEDs 1311 have the colour "white". The second LEDs 1112 can have the colour "green", and the third LEDs 1313 can have the colour "blue", and the fourth LEDs 1314 can have the colour "red". The LEDs 131 can therefore generate, for example, RGBW colour patterns.

The front side 1391 of the support 139 can have a structure pattern which is formed from a plurality of adjoining hexagonal cells of equal size. Such a structure pattern is shown by way of example in FIG. 1A and also in FIG. 1B. Each of the hexagonal cells 1395 can have a hexagonal peripheral profile. In this case, all six sides can be of equal length and additionally all angles can also be of equal size. In other embodiments, the side lengths can differ. For example, the front side 1391 of the support 139 is continuously filled with the structure pattern, i.e., continuously filled with the hexagonal cells 1395—except for a peripheral region. This continuous filling can also be referred to as tessellation. The structure pattern of the front side 1391 can be a hexagonal tessellation. For example, a single hexagonal cell 1395 in the hexagonal tessellation only has neighbours which are connected via complete edges, but none of which is connected via corners or edge parts, as illustrated in FIG. 1B.

Figure 1B:
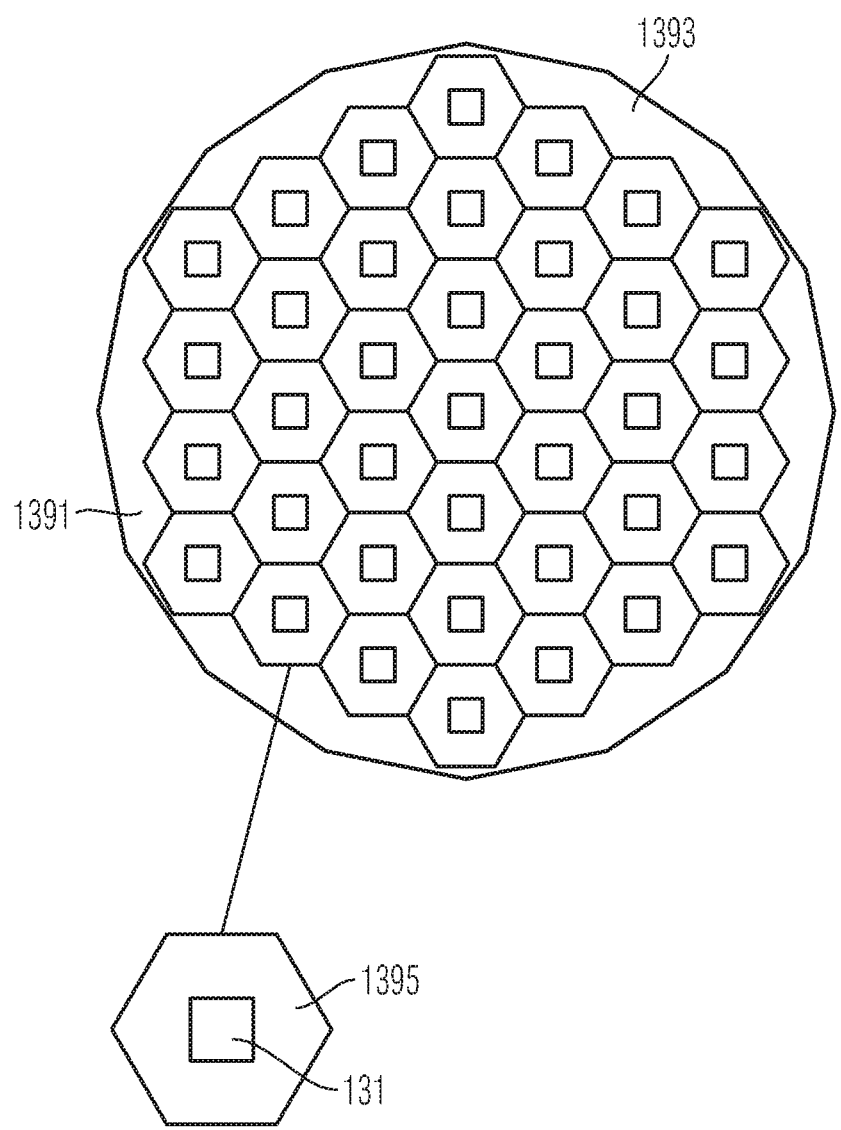
FIG. 1B schematically shows a detail of a top view of a hexagonal tessellation according to one or more embodiments.

According to one embodiment, each of the LEDs 131 is provided in a separate hexagonal cell, as schematically shown in FIGS. 1A-B. The structure pattern having the hexagonal cells can fill the front side 1391 completely or nearly completely, and each of at least 90% of the hexagonal cells can be occupied with a single one of the LEDs 131. This proportion can also be higher than 90%, for example, it is 95% or even at least 98%. Unoccupied hexagonal cells can be used, for example, for the arrangement of a mechanical support and/or for laying power lines, for example, conductor tracks.

Furthermore, the LEDs 131 can be symmetrically distributed in relation to the centre point of the front side 1391, which will be explained hereafter on the basis of the exemplary illustration in FIG. 1A, where said first LEDs 1311, second LEDs 1312, third LEDs 1313, and fourth LEDs 1314 are provided.

For example, the first LEDs 1311 are arranged along the solid line. The second LEDs 1312 can be arranged along the dotted line, and the third LEDs 1313 can be arranged along the alternately dot-dash line, and finally the fourth LEDs 1314 can be arranged along the dashed line.

Current paths can be formed along said lines, which supply the relevant LEDs with current. The LEDs 131 or subgroups can thus be electrically connected to one another via a number of current paths, wherein the current paths can also be arranged on the front side 1391 of the support 139. As illustrated in FIG. 1A, the current paths can each have a wedge-shaped profile, the tip of which is essentially points into the centre of the front side. Some tips point directly into the centre, while in contrast other tips do not point precisely into the middle of the front side 139, but rather slightly adjacent, which is because of the hexagonal tessellation, for example. The wording "essentially into the centre" is therefore used.

As is furthermore illustrated in FIG. 1A, the current paths can be laid in such a way that they do not intersect in any plane of the support.

The symmetrical distribution can additionally be designed in such a way that the different LEDs each have their geometrical focal point at the centre point of the front side 1391. For example, the geometrical centre point of the distribution of the first LEDs 1311 and the geometrical centre point of the distribution of the second LEDs 1312 are coincident with the centre point of the front side 1391. The geometrical centre point of the distribution of the third LEDs 1313 and the geometrical centre point of the distribution of the fourth LEDs 1314 can also be coincident with the centre point of the front side 1391.

Furthermore, the LEDs 131, for example, the first LEDs 1311, the second LEDs 1312, the third LEDs 1313, and/or the fourth LEDs 1314 can each have an equal mean distance from the centre point of the front side 1191, as shown in FIG. 1A.

For example, each hexagonal cell 1395 has an area of less than 6 mm². In one embodiment, the filling factor, for example, defined by the total light-emitting area of the LEDs 131 per unit of area of the front side 1391, is at least 15%.

The support 139 can comprise a single-layer PCB, which is designed to supply an electrical current to each of the LEDs 131, for example, by means of said current paths. The support 139 can also be designed as a single-layer PCB. The above-described arrangement of the LEDs 131 can be carried out in such a way that the current paths for the first LEDs 1311, the second LEDs 1312, and the third LEDs 1313, and also the fourth LEDs 1314 do not intersect in any level of the support 139. For example, the four different current paths extend along the solid line shown in FIG. 1A (for the first LEDs 1311), the dotted line (for the second LEDs 1312), along the alternately dot-dash line (for the third LEDs 1313), and along the dashed line (for the fourth LEDs 1314). According to one embodiment, so-called multilayer PCBs can thus be omitted. All current paths can have said wedge-shaped profile, the tip of which points into the centre of the support 139.

Figure 2:
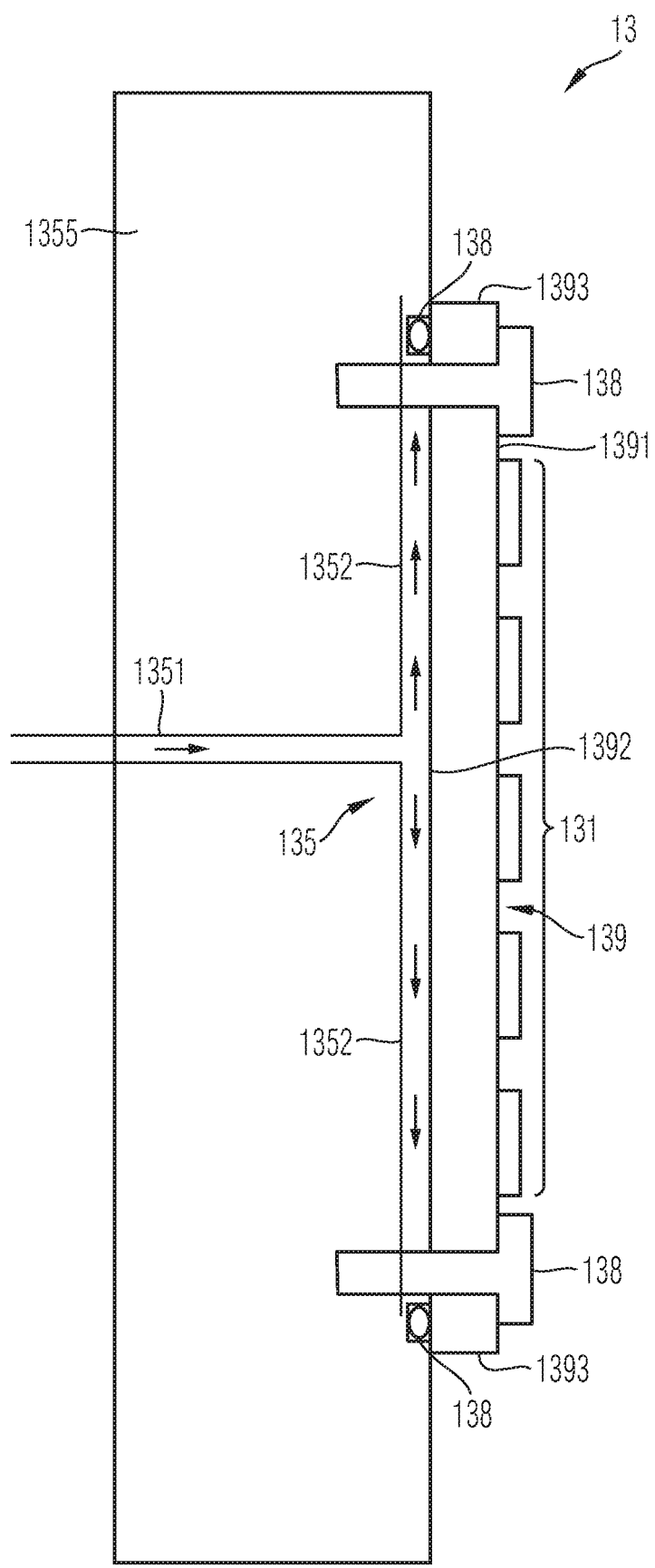
FIG. 2 schematically shows a detail of a vertical cross section of a light source arrangement according to one or more embodiments.

FIG. 2 illustrates a further optional feature on the basis of a vertical cross section, according to which the light source arrangement 13, which can be designed, for example, according to one or more of the above-described embodiments, in particular can thus have the hexagonal tessellation (see FIG. 1B) and/or the symmetrical distribution of the different LEDs 131, can have a liquid cooling unit 135 coupled to the support 139, which is designed to dissipate waste heat produced by the LEDs 131.

The liquid cooling unit 135 can be arranged in a mount 1155, which can be fastened, for example, via one or more fastening elements 138 on a rear side 1192 of the support 139.

The liquid cooling unit 135 can be attached, for example, on the rear side 1392 of the support 139. According to one embodiment, the liquid cooling unit 135 has a supply 1351, which guides liquid to the central point of the rear side 1392, for example, opposite to said centre point of the front side 1391. In other words, the central point can be a centre point of the rear side 1392. Furthermore, the liquid cooling unit 135 can comprise a drain line 1352, which guides liquid away from the central point in the direction of the peripheral region 1393 of the support 139. If the support 139 has an approximately circular cross section, for example, the supply line 1351 can thus extend essentially perpendicularly to the central point, which is opposite to the centre point of the front side 1391, in relation to which the LEDs 131 can be arranged symmetrically. At this point, the supply line 1351 can merge into the drain line 1352, which then guides the liquid, for example, in the radial direction toward the peripheral region 1393. In this manner, an essentially homogeneous temperature distribution can be ensured on the support 139. For example, the most waste heat is produced at the central point, so that it can be reasonable to supply the coolest liquid to this point, and then to guide it in the radial direction, i.e., for example, in the direction of a negative temperature gradient.

A further optional feature of the light source arrangement 13 is to be explained with reference to FIGS. 3 to 5. The light source arrangement 13, which can be designed, for example, according to one of the above-described embodiments, for example, with respect to the design of the front side 1391 of the support 139, the arrangement of the LEDs 131, and/or the dissipation of the waste heat, can have a primary lens arrangement 15, which is positioned at a distance between 50 μm and 1 mm from the LEDs 131, wherein the primary lens arrangement 15 comprises at least one lens element 151 for each of the LEDs 131.

For example, the LEDs 131 on the support 139 are not provided with a lens. According to one embodiment, the LEDs 131 are thus not in contact with lens elements 151 as is the case, for example, with the known TIR lenses, which can be installed directly on the LEDs or can be slipped over them. The LEDs 131 can be arranged in a completely separate location from the lens elements 151 here, for example, in such a way that there is no location overlap region between the LEDs 131 and the lens elements 151.

Figure 3:
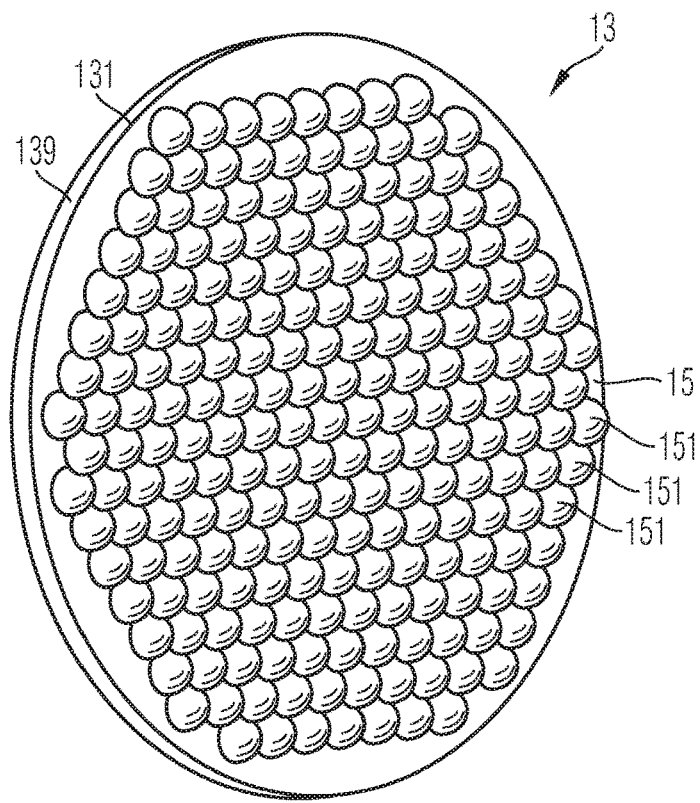
FIG. 3 schematically shows a detail of a perspective view of a light source arrangement according to one or more embodiments.
Figure 4:
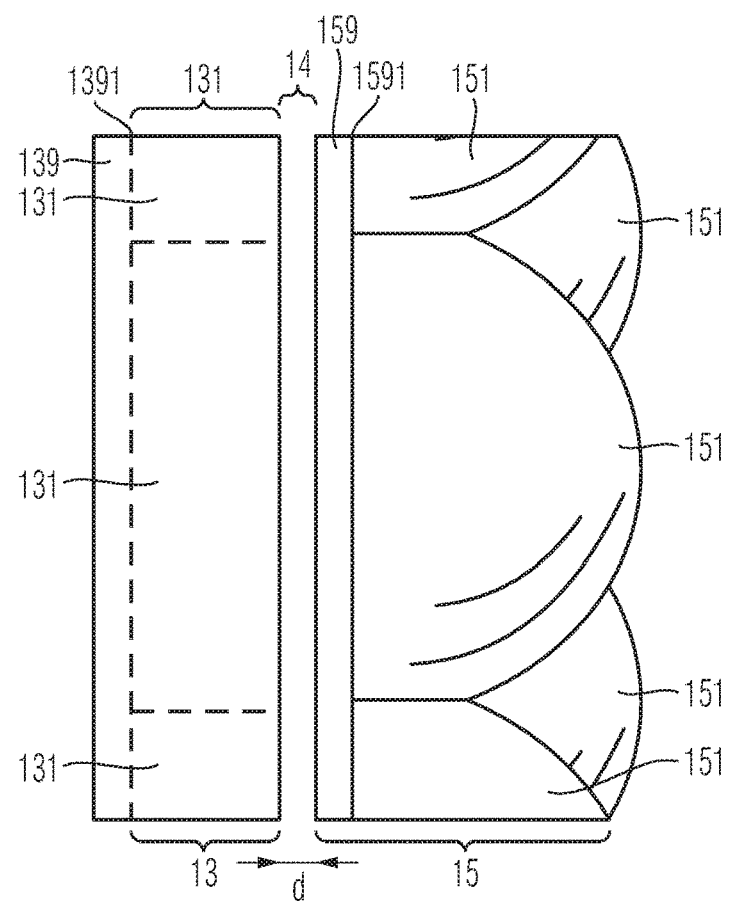
FIG. 4 schematically shows a detail of a vertical cross section of a light source arrangement according to one or more embodiments.

The support 139 can have essentially the same area as a support 159 of the primary lens arrangement 15, as illustrated in FIGS. 3 and 4. If the front side 1391 of the support 139 has, for example, a structure pattern having a hexagonal tessellation, at least one lens element 151 can thus be provided for each hexagonal cell 1395. In FIG. 4, the LEDs 131 are only schematically shown and it is apparent that the LEDs 131 do not necessarily have to directly adjoin one another. A front side 1591 of the support 159 of the primary lens arrangement 15 can also have a structure pattern having a hexagonal tessellation, wherein a lens element 151 can be provided in each hexagonal cell of the structure pattern of the front side 1591.

The distanced between the primary lens arrangement 15 and the LEDs 131 is, for example, parallel to the light exit direction of the light of the LEDs 131. It can be formed by an air gap 14. The lens elements 151 each have an identical shape, for example, which is hemispherical or aspheric on a light exit side, for example. A total extension of the lens elements 151 parallel to the normal of the front side 1591 is, for example, in the range of 1 mm to 4 mm.

The lens elements 151 of the primary lens arrangement 15 can be manufactured from pressed glass, plastic, or silicone. According to one embodiment, the primary lens arrangement 15 is designed in the form of a silicone-on-glass construction. For example, the support 159 can be manufactured from glass, while in contrast the lens element 151 can be made of silicone.

The graph 5A in FIG. 5 shows the light density L in an arbitrary unit (abbreviated: arb. un.) over the position X, also in an arbitrary unit, as can be produced according to one embodiment by the LEDs 131. Because of a distance of the LEDs 131 in relation to one another, a pulsed, i.e., not interruption-free profile can result over the position X, as illustrated by the graph 5A. Without further optical processing, the light density L produced by the LEDs 131 would be essentially constant over the angle range a between −90° and +90° according to one embodiment, as illustrated by the graph 5B.

The position distribution of the light density L can be homogenized by the primary lens arrangement 15 arranged at the distanced to the LEDs 131 (see graph 5C) and the light can be output in a light cone having a smaller aperture angle β, which is less than 35°, for example (see graph 5D).

According to another aspect, a light mixing tube 17 can be downstream of the primary lens arrangement 15, which will be explained in greater detail with reference to FIGS. 20 to 22.

According to one embodiment, the light source arrangement 13 is designed to be operated at a power of at least 400 W and to output light in a strength of at least 25,000 lm (25 klm). At the same time, the diameter of the support 139 can be smaller than 50 mm.

The light source arrangement 13 having the primary lens arrangement can form a platform for many different types of spotlight, as will be demonstrated hereafter. In particular, the light source arrangement 13 or multiple embodiments thereof can be used to form a spotlight according to FIGS. 6 to 14.

FIGS. 6 to 8 show various views of a spotlight 1 for illuminating a film, studio, stage, event, and/or theatre environment. The spotlight 1 comprises a reflector arrangement 11, which delimits a reflector interior 114 with a reflective inner surface 113. A pre-reflector 116 can also be associated with the reflector arrangement 11, which can also contribute to the inner surface 113, as will be explained in greater detail hereafter. The reflector arrangement 11 is also simply referred to as a "reflector" 11 hereafter.

The reflective inner surface 113 of the reflector 11 can be formed like a truncated cone growing in diameter in the direction of the light exit or similar to a paraboloid. The reflector 11 emits the light approximately in the Z direction, which can be perpendicular to an XY plane. The reflector arrangement 11 can thus be a curved reflector.

Figure 14:
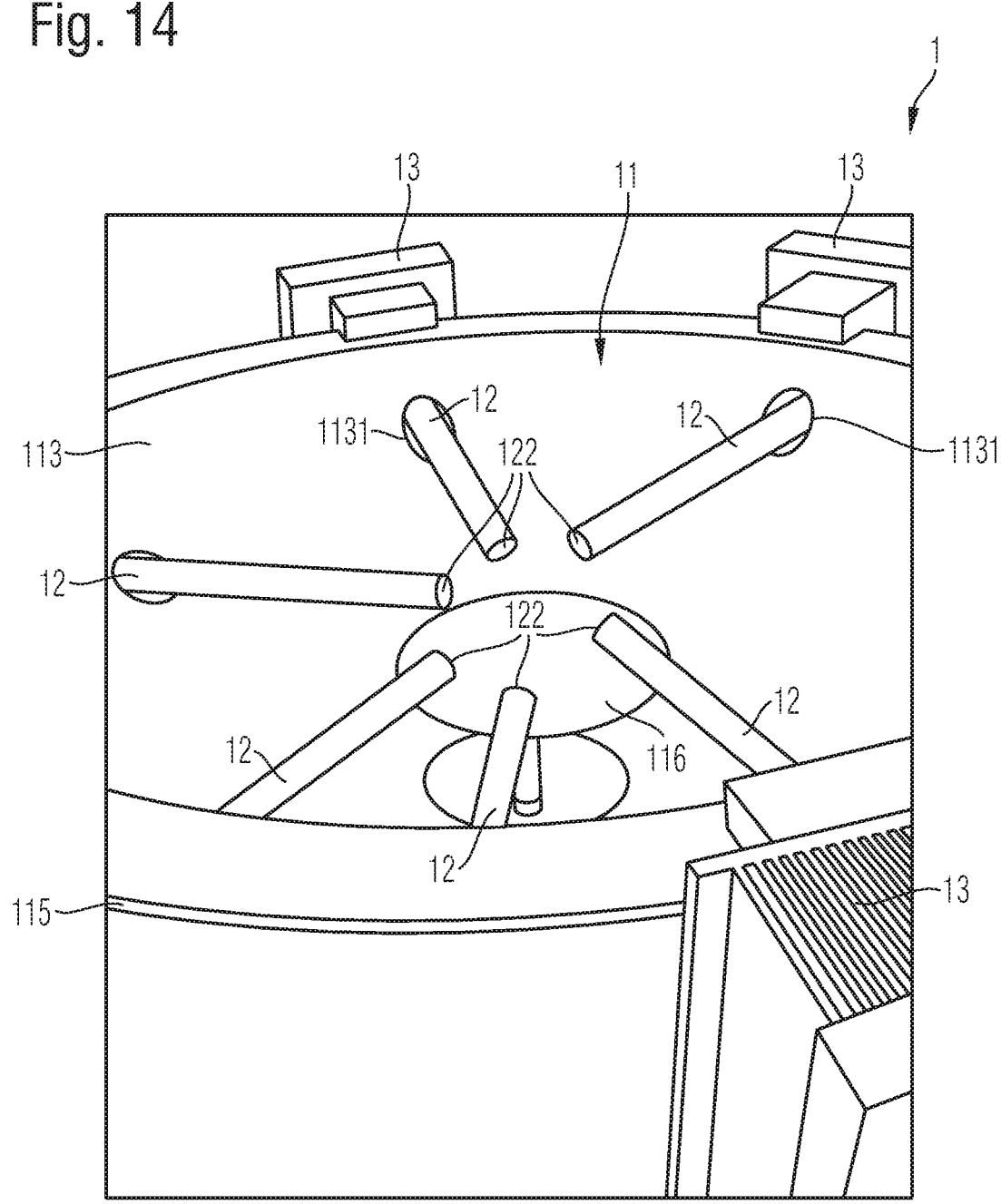
FIG. 14 schematically shows a detail of a perspective view of a spotlight according to one or more embodiments.

Furthermore, passive light guides 12 are provided, which have feed points 121. These feed points 121 can be arranged outside the reflector interior 114. The light guides 12 additionally have light output points 122, which are arranged inside the reflector interior 114. The light guides 12 can thus penetrate the inner surface 113 of the reflector arrangement 11 (as shown in FIG. 14, in contrast to the exemplary embodiments according to FIGS. 6-8 and 12; however, it can also be advantageous for the light guides 12 to penetrate the reflector, contrary to the schematic illustration, in the latter exemplary embodiments, as illustrated, for example, in FIG. 14). The passive light guides 12 can have a longitudinal extension defined by a distance between the respective feed point 121 and the respective light output point 122 in the light guiding direction R, which is at least multiple times greater than a transverse extension perpendicular to the light guiding direction R. The light guides 12 can be formed rod-shaped, for example.

An electrically operated light source arrangement can be arranged outside the reflector interior 114, which is designed to generate light and feed it in at the feed points 121 of the passive light guides 12. For example, the light source arrangement of the spotlight 1 is designed according to one or more of the above-described embodiments of the light source arrangement 13. For example, such a light source arrangement 13 is provided at every light feed point 121 (see also FIG. 14).

The passive light guides 12 can be arranged radially symmetrically and can point in a star shape at the same point of the reflector interior 114. The passive light guides 12 can be arranged along an imaginary circle and the longitudinal extensions can each be oriented perpendicularly in relation to the peripheral profile of the imaginary circle. Furthermore—contrary to the exemplary illustration in FIGS. 6-8, 12, and 14—the number of passive light guides 12 can be odd. For example, the number is 3, 5, 7, 9, 11, 13, or 15. More than 15 light guides 12 can also be provided. The passive light guides 12 can be arranged at a constant angular interval in relation to one another. As described above, the reflective inner surface 113 of the reflector 11 can be formed like a cylinder growing in diameter in the direction of the light exit. The light output points 122 of the light guides 12 can be arranged concentrically in relation to the inner surface 113 of the reflector 11.

Figure 9:
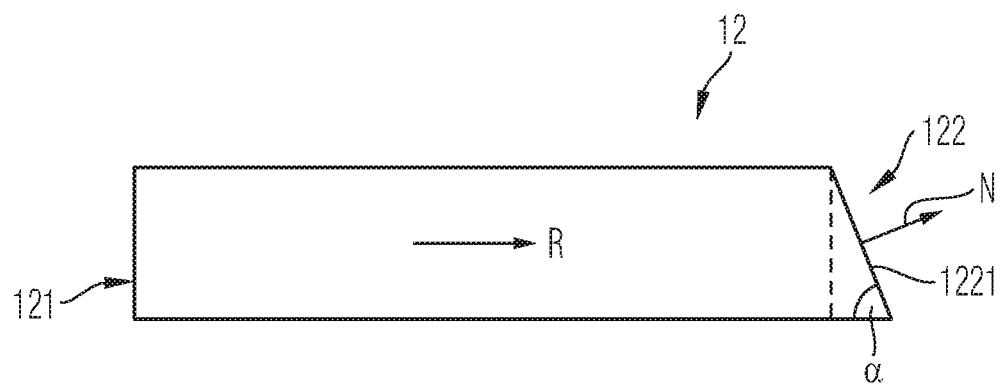
FIG. 9 schematically shows a detail of a side view of a passive light guide of a spotlight according to one or more embodiments.
Figure 10:
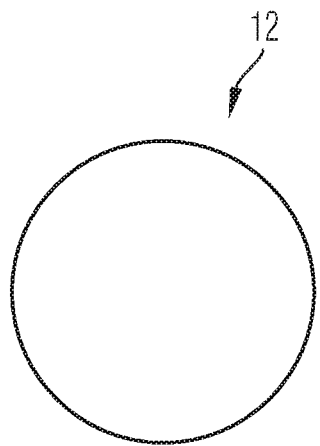
FIGS. 10-11 each schematically show a detail of a vertical cross section of a passive light guide of a spotlight according to one or more embodiments.
Figure 11:
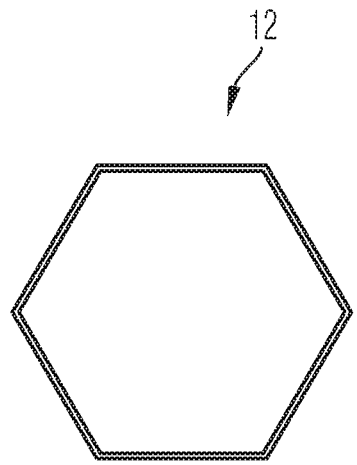

FIG. 9 shows a side view of a light guide 12 and FIGS. 10 and 11 show various cross sections of a light guide 12. The light guide 12 can be designed to guide the light coupled in at the light feed point 121 in the guide direction R up to the light output point 122. Furthermore, the light guide 12 can be designed to mix the light coupled in at the light feed point 121, so that, for example, mixed light exits at the light output point 122.

The light guide 12 can be designed as a total internal reflection (TIR) light guide. Accordingly, no or only an insignificant proportion of the light exits in the radial direction along the longitudinal extension of the light guide 12. The light output point 122 of the passive light guide 12 can be formed by an essentially planar light guide terminus face 1221, the surface normal N of which can be oriented at an angle of less than 30° in relation to the longitudinal extension of the respective light guide 12. In addition, in some embodiments this angle is greater than 5°. In other words, in some embodiments the light guide terminus face 1221 is not arranged perpendicularly in relation to the longitudinal extension of the light guide 12, but rather diagonally thereto.

The light guide 12 can be formed from a glass material. The light guide 12 can have an essentially cylindrical shape, for example, can have a nearly circular cross section, as illustrated in FIG. 10. In other embodiments, the light guide 12 has a polygonal cross section, for example, a hexagonal cross section, as illustrated in FIG. 11. For example, the cross section remains constant with respect to its area and with respect to its shape over at least 95% of the longitudinal extension of the light guide 12.

The cross-sectional area of the light guide 12 can be adapted to the light source arrangement 13. If the light source arrangement 13 is designed, for example, according to one of the above-described embodiments, the cross-sectional area of the light guide 12 perpendicular to the light guiding direction R is thus, for example, the area of the front side 1391 of the support 139 of the light source 13 multiplied by a factor of 0.9 to 1.5. This factor can vary as a function of a distance between the light source 13 and the light guide 12.

All light guides provided in the spotlight 1 can be formed identically, for example, as described in the above paragraphs.

Figure 12:
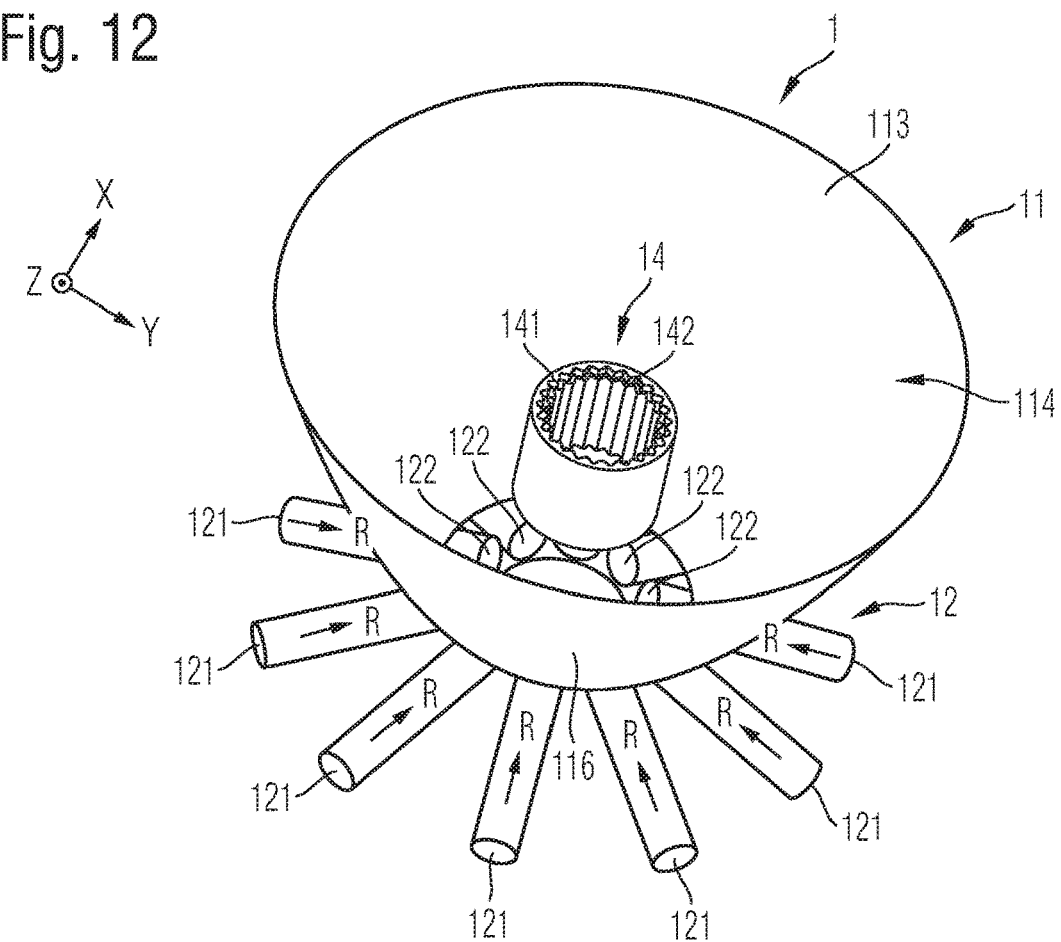
FIG. 12 schematically shows a detail of a perspective view of a spotlight according to one or more embodiments.
Figure 13:
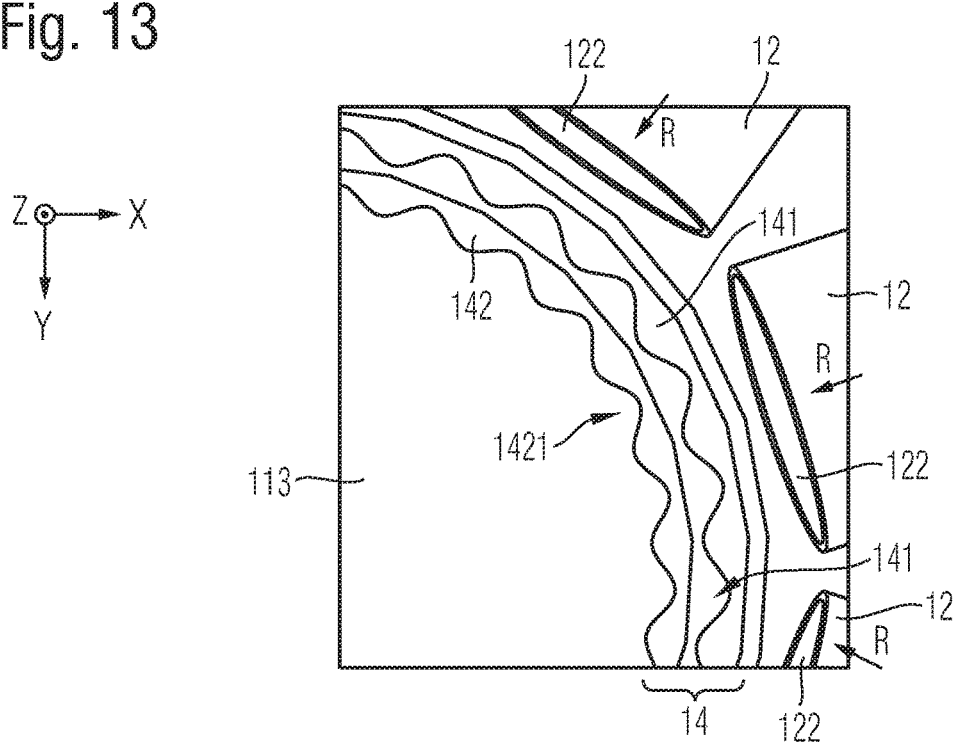
FIG. 13 schematically shows a detail of a top view of a spotlight according to one or more embodiments.

According to the exemplary embodiment according to FIGS. 12 and 13, the spotlight 1 can additionally comprise a lens arrangement 14 arranged in the reflector interior 114, which has two diffusing lens elements 141, 142 oriented concentrically in relation to one another, the inner surfaces 1411, 1421 of which each have a wavy structure. The lens arrangement 14 is used, for example, for the purpose of virtually enlarging the light source and thus generating a greater emission angle of the spotlight, for example, to achieve or implement a zoom function. For this purpose, the two elements 141, 142 can be arranged movably in relation to one another, so that the relative distance between the lens element 141 and the lens element 142 can be changed. For example, only one of the two lens elements 141, 142 is movably arranged, or both elements 141, 142 are arranged movably in relation to one another.

Finally, FIG. 14 illustrates a further embodiment of the spotlight 1, according to which the reflector arrangement 11 has a support 115, which forms or supports the reflective inner surface 113. In this case, the light source arrangement 13 can be arranged completely outside the support 115. In the example according to FIG. 14, a separate light source arrangement 13 is provided for each light guide 12. Because of the arrangement of the light source arrangement 13 outside the support 115, no specifications exist with respect to the dimensioning of the light source arrangements 13, which would result from the size of the reflector interior 114. The inner surface 113 can have recesses 1131, through which the light guides 12 can pass, so that the light can be supplied at the light output points 122 to the reflector 11 and/or the pre-reflector 116.

The light source arrangements 13 for the spotlight 1 according to one or more of the embodiments as per FIGS. 6 to 14 can be designed as explained above with reference to FIGS. 1 to 5. Accordingly, a respective light source arrangement 13 can in particular have the support 139 having a hexagonal tessellation located on the front side 1391 and the LEDs 131, which can be symmetrically distributed in accordance with the above-described embodiments in relation to the centre point of the front side 1391. Furthermore, in each light source arrangement 13, a primary lens arrangement 15 downstream therefrom can be provided according to one of the above-described embodiments. The light which is decoupled by this primary lens arrangement 15 can then be fed to the light feed point 121 of a respective light guide 12. Moreover, contrary to the schematic illustration of FIG. 14, instead of air cooling by means of cooling slots, said liquid cooling unit 135 can be provided.

A further embodiment of a spotlight 1 according to another aspect of the invention will be explained with reference to FIGS. 15 to 18. The spotlight 1 illustrated therein can have a light source arrangement 13 having a primary lens arrangement 15 according to one of the above-described embodiments. The primary lens arrangement 15 emits light, for example, at an angle β of less than or equal to +/−35°. Reference is made to the above statements with respect to further exemplary embodiments of the light source arrangement 13 of a primary lens arrangement 15 having it.

Figure 15:
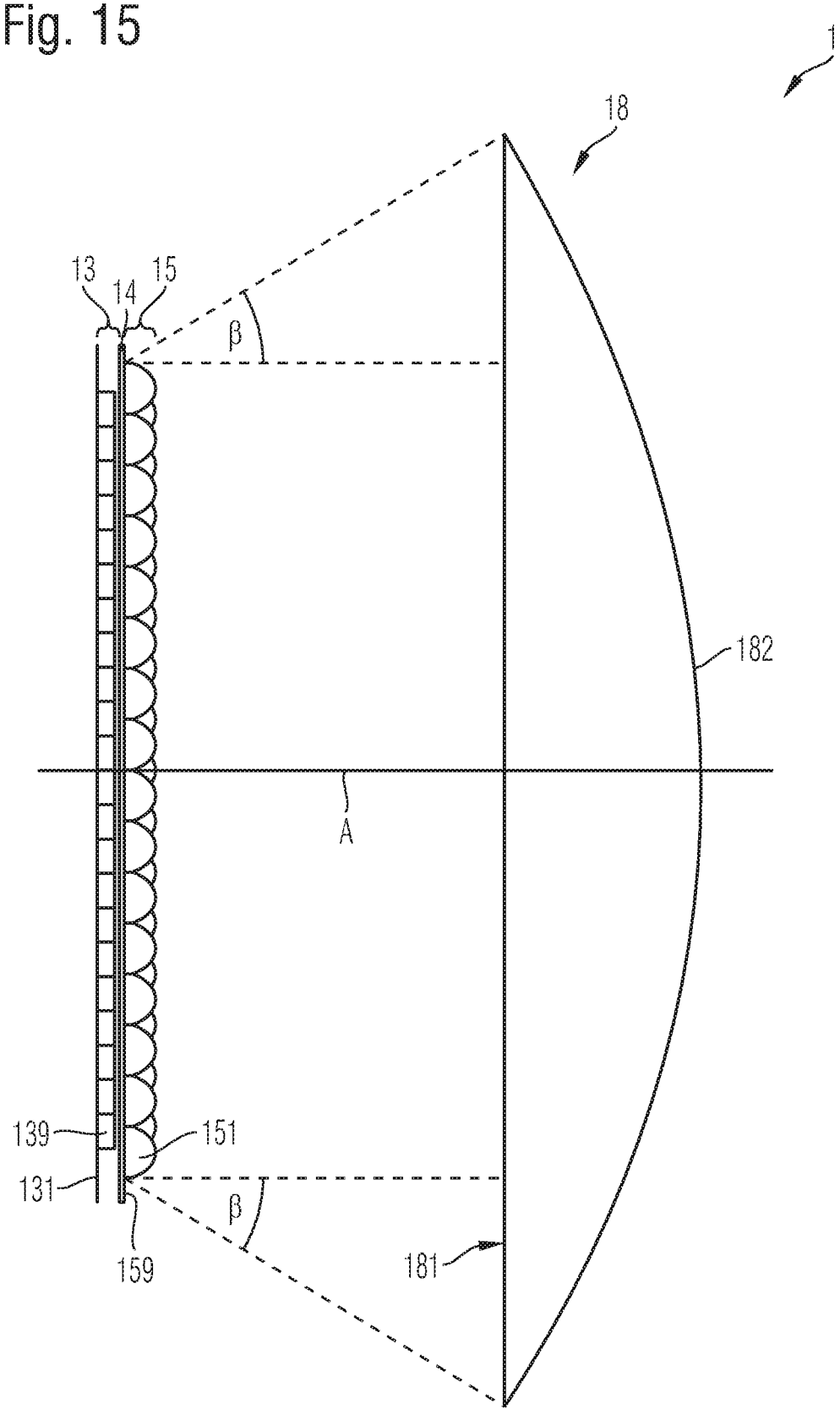
FIG. 15 schematically shows a detail of a vertical cross section of a spotlight according to one or more embodiments.
Figure 16:
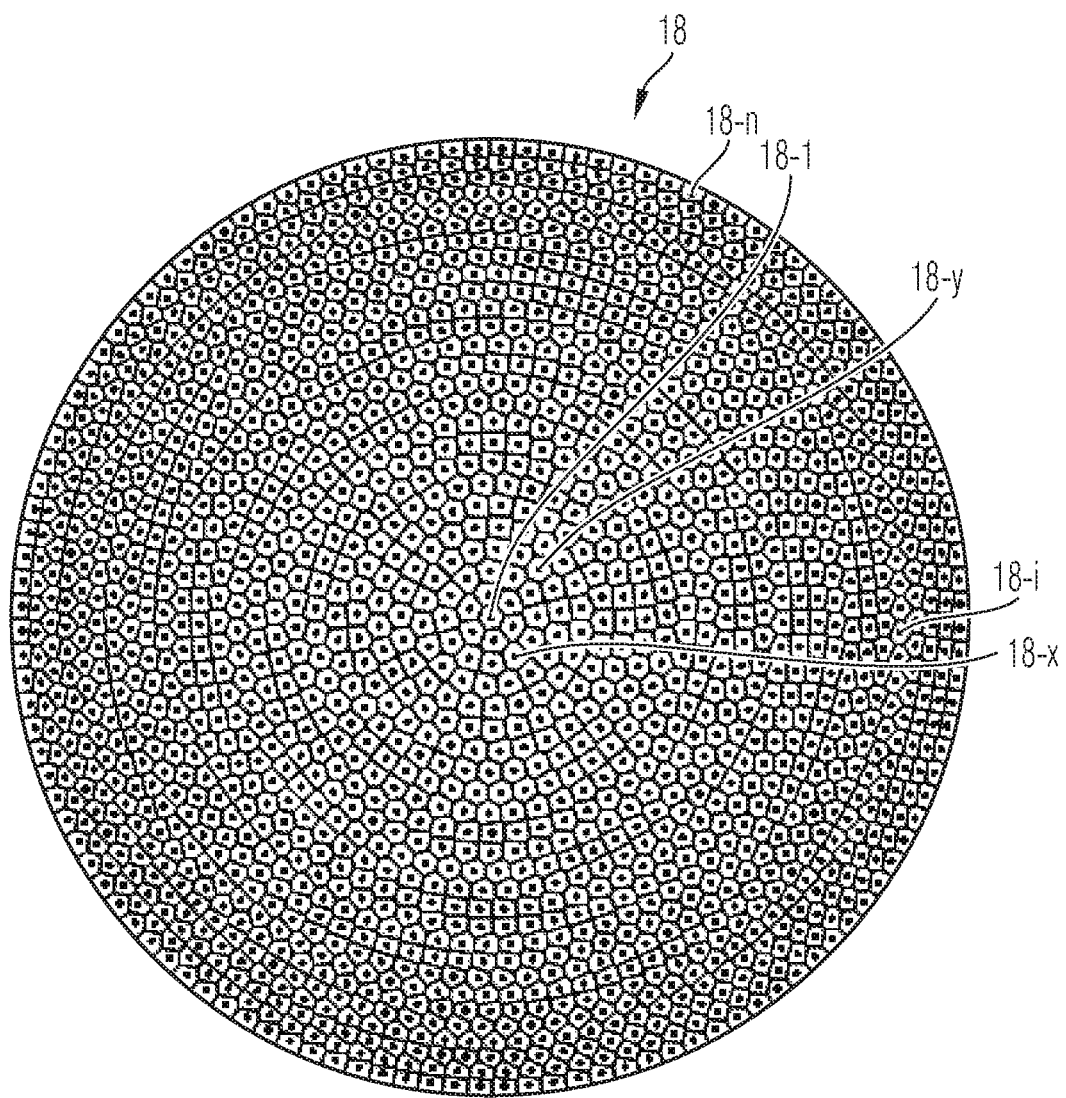
FIG. 16 schematically shows a detail of a top view of a condenser arrangement of a spotlight according to one or more embodiments.
Figure 17:
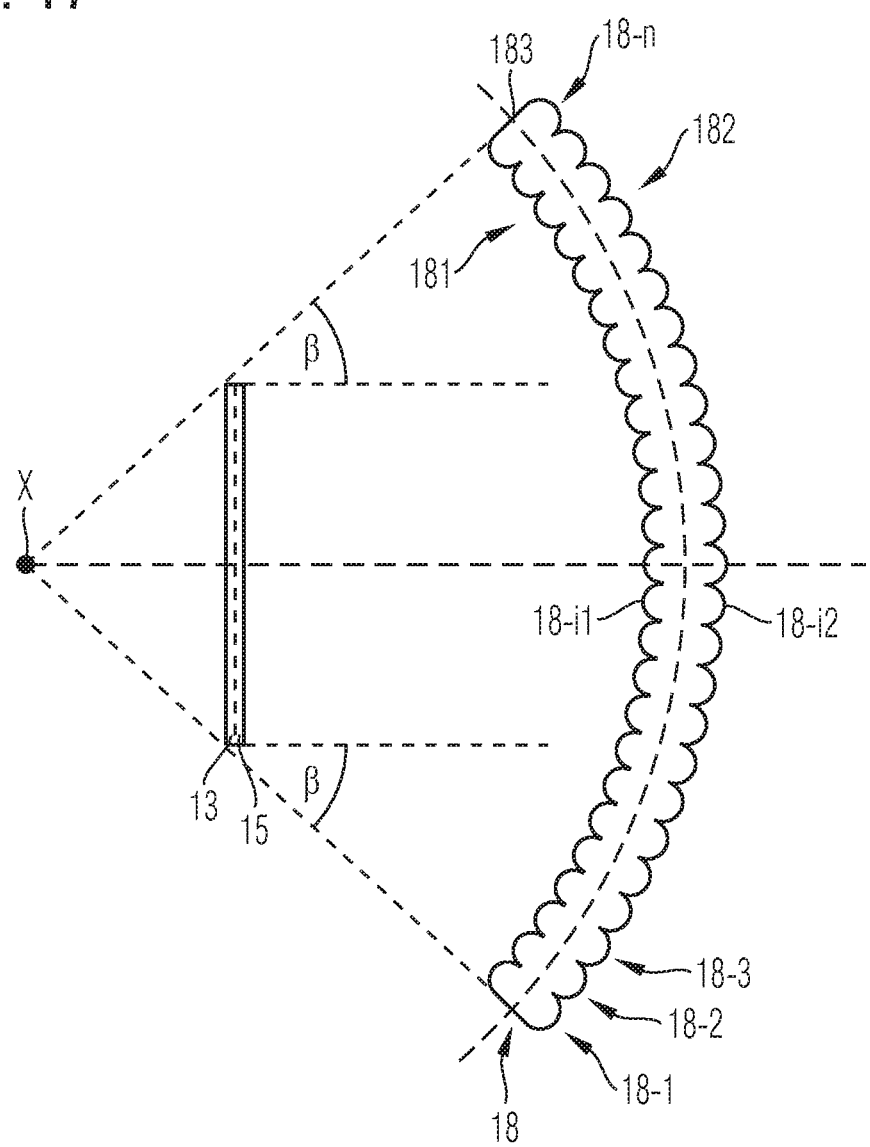
FIGS. 17-23 each schematically show a detail of a vertical cross section of a spotlight according to one or more embodiments.
Figure 18:
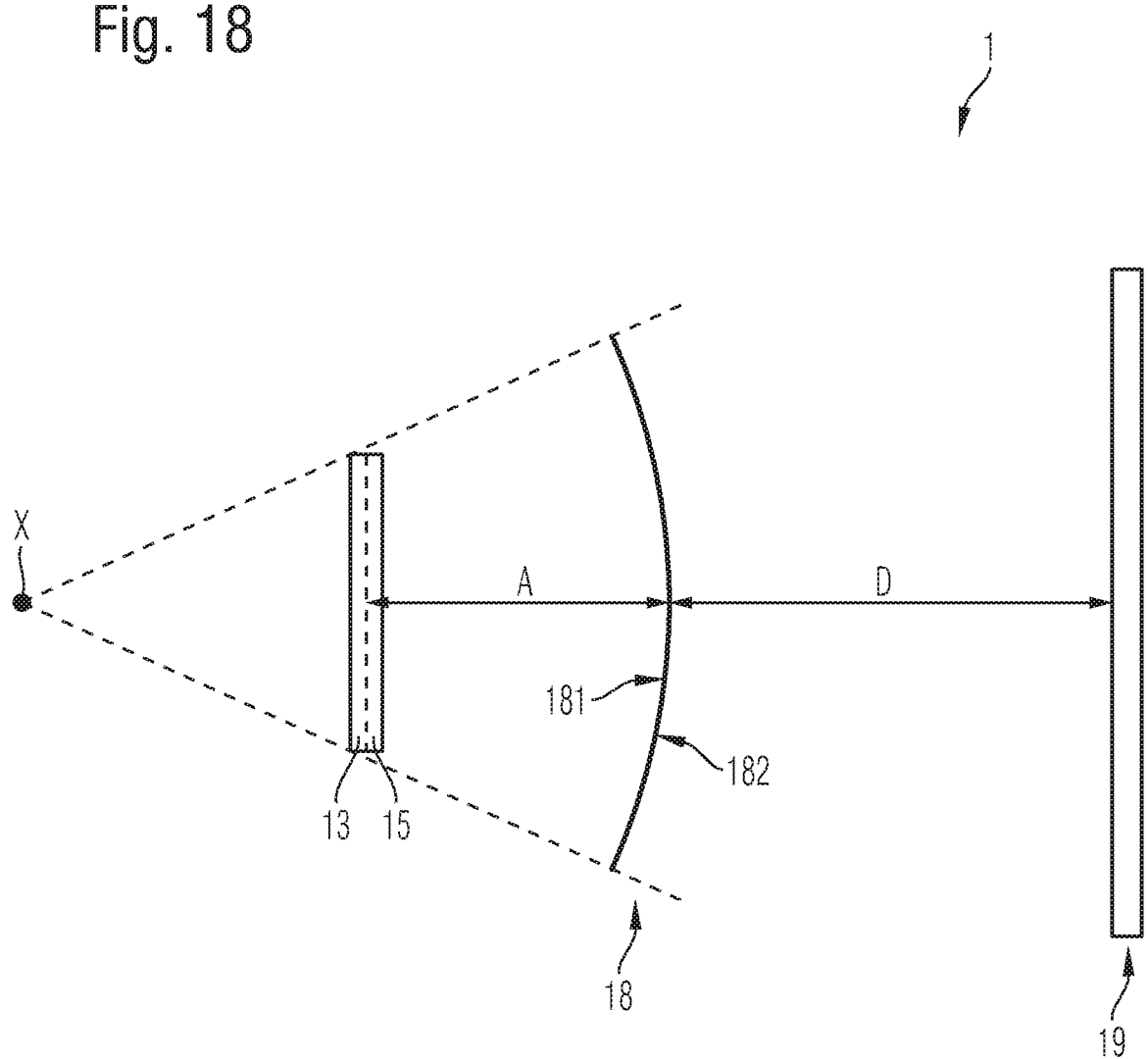
Figure 19:
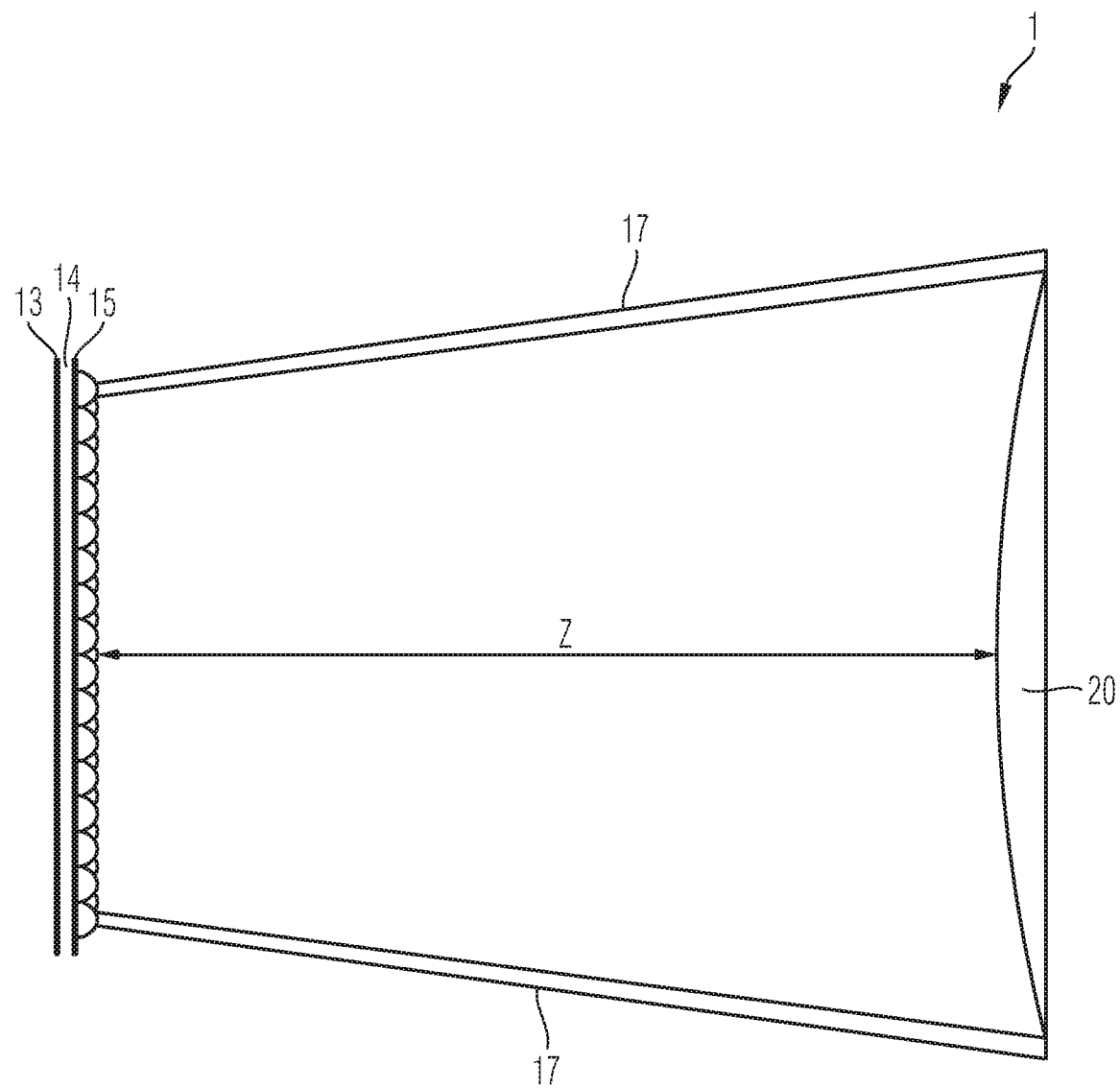

A condenser arrangement 18 can be provided at a distance A of at least 40% of the diameter of the support 139 of the light source arrangement 13. The distance can also be approximately 50% of the diameter of the support 139. For example, the condenser arrangement 18 has a concave light incidence surface 181 in relation to the location of the light source arrangement 13. For example, the distance A is not changed during the operation of the spotlight 1. The condenser arrangement 18, as shown in FIGS. 15 and 17-18, can have the shape of a spherical shell element. Therefore, in one embodiment the condenser arrangement 18 does not have, for example, like the primary lens arrangement 15, a planar shape, but rather that of a spherical cap. A Fresnel lens arrangement 19 can be connected downstream at a further distance D from the condenser arrangement 18, as illustrated in FIG. 18. According to one embodiment, the spotlight 1 is designed according to FIGS. 15-18 as a Fresnel spotlight. The Fresnel lens arrangement 19 can be arranged movably with respect to its distance D from the condenser arrangement 18. At a short distance D from the condenser arrangement 18, the Fresnel spotlight 1 is operated in a so-called flood setting, for example, and at a long distance D from the condenser arrangement 18, the Fresnel spotlight 1 is operated, for example, in a so-called spot setting.

The condenser arrangement 18 can have a plurality of microlenses 18-1 to 18-*n*, which are arranged according to a pattern. An exemplary pattern will be explained on the basis of FIG. 16: accordingly, the microlenses 18-1 to 18-*n* can be positioned along a plurality of concentric circles. In this case, the number of microlenses per circular line can increase in the radial direction. Furthermore, the microlenses 18-1 to 18-*n* of each circular line can be spaced apart at an equal spacing angle from one another. This spacing angle can decrease from circular line to circular line, so that the azimuth density of the microlenses 18-1 to 18-*n* increases in the radial direction. Furthermore, a microlens 18-*y* of one of the circular lines can be arranged sheared by a shear angle in comparison to a reference microlens 18-*x* of an adjacent circular line. This shear angle can be the golden angle (~137.5°). This shear angle can apply to all adjacent circular lines. Proceeding, for example, from the first (inner) circular line, the shearing can take place by the golden angle toward the second circular line. From the second circular line to the third circular line, the shearing again takes place by the golden angle, etc. A single microlens 18-1 can be arranged in the centre of the condenser arrangement 18.

The circular lines can be arranged at an equidistant distance from one another in the radial direction. In other embodiments, the distance of circular line to circular line can vary in the radial direction.

It is illustrated on the basis of FIG. 17 that the microlenses 18-1 to 18-*n* can each be formed double-sided, on the one hand, can thus have a respective entry surface 18-*i*1 on the light incidence side 181 and, on the other hand, a respective exit surface 18-*i*2 on the light exit side 182. The entry surface 18-*x*1 and the exit surface 18-*x*2 can be formed symmetrically to one another with respect to a centre line 183 of the condenser arrangement 18. The entry surface 18-*x*1 can be formed by an entry lenslet, and the exit surface 18-*x*2 by an exit lenslet. Both the entry surface 18-*x*1 and also the exit surface 18-*x*2 can have a concave profile with respect to the centre line 183. From another perspective, the microlenses 18-1 to 18-*n* can each have a biconvex shape.

According to one embodiment, the microlenses 18-1 to 18-*n* are oriented on a common reference point X, which is upstream of the support 139 of the light source arrangement 13, as illustrated in FIG. 17. The condenser arrangement 18 can have the form of a shell piece of an imaginary sphere (spherical cap) and the reference point X can form the centre point of this imaginary sphere.

A further embodiment of a spotlight 1 will be explained with reference to FIGS. 19 to 26. The spotlight 1 illustrated therein can have a light source arrangement 13 having a primary lens arrangement 15 according to one of the above-described embodiments. The primary lens arrangement 15 emits light, for example, at an aperture angle β of less than or equal to +/−35°. Reference is made to the above statements with respect to further exemplary embodiments of the light source arrangement 13 of a primary lens arrangement 15.

A field lens arrangement 20 can be provided at a distance Z of, for example, 60 to 150 mm from the primary lens arrangement 15. The field lens arrangement 20 can be embodied as convex-planar. Moreover, the field lens arrangement 20 can be manufactured from a pressed glass. For example, a light mixing tube 17 relays the light output by the primary lens arrangement 15 to the field lens arrangement 20. The light mixing tube 17 can be designed to mix the light output by the primary lens arrangement 15. Therefore, the primary lens arrangement 15 and also the field lens 20 can be coupled to one another by means of the light mixing tube 17. A projection optical unit 21, which is schematically shown in FIG. 26, can furthermore be downstream of the field lens arrangement 20. The projection optical unit 21 can have, for example, a pnp lens arrangement. According to one embodiment, the spotlight 1 according to FIGS. 19-26 is designed as a tracking spotlight (also known as an "ellipsoidal" or "follow spot" spotlight).

Figure 20:
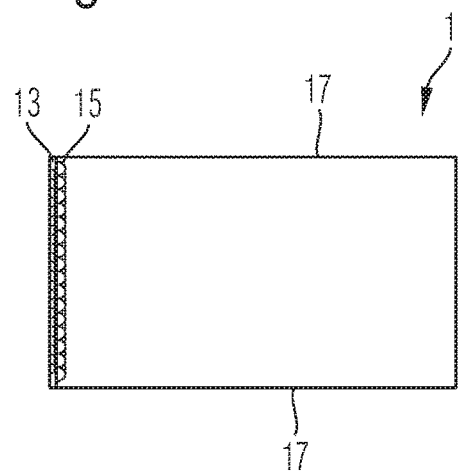
Figure 21:
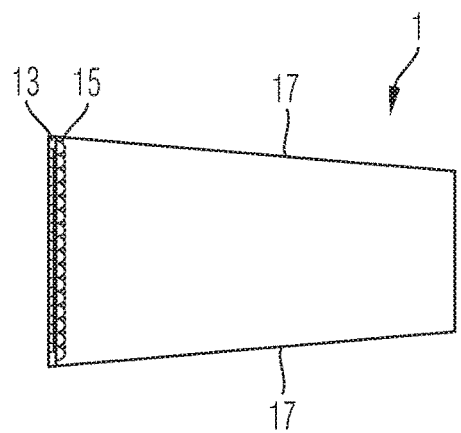
Figure 22:
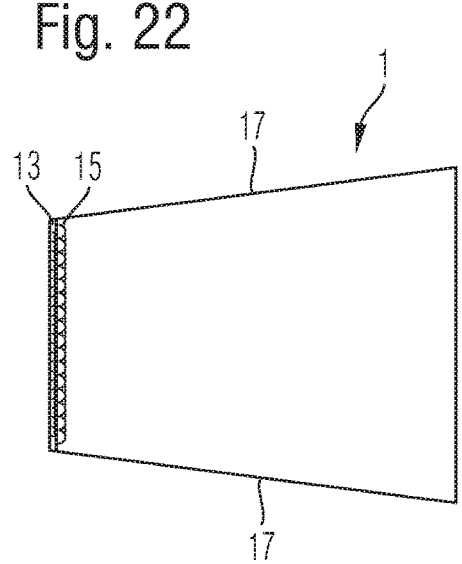
Figure 23:
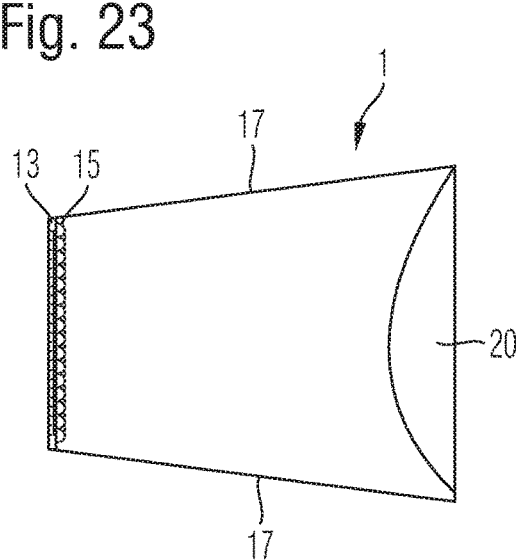

It should be emphasized at this point that the spotlight 1 according to the embodiments of FIGS. 19 to 26 does not necessarily have to comprise the field lens arrangement 20. According to one embodiment, the spotlight 1 comprises the light source arrangement 13 having the primary lens arrangement 15 and also the light mixing tube 17 coupled thereon, as illustrated in FIGS. 20 to 22. The light mixing tube 17 can output the light directly onto the region to be illuminated.

Figure 24:
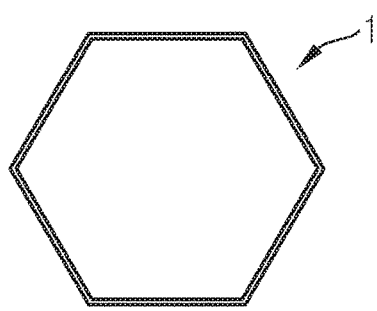
FIGS. 24-25 each schematically show a detail of a vertical cross section of a mixing tube of a spotlight according to one or more embodiments.
Figure 25:
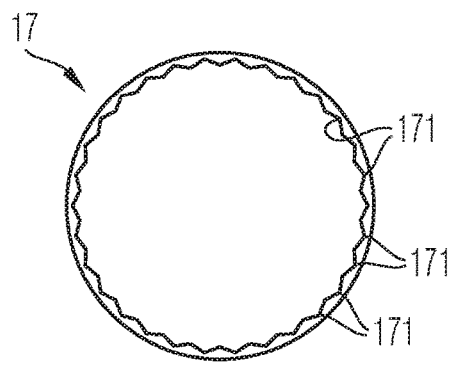
Figure 26:
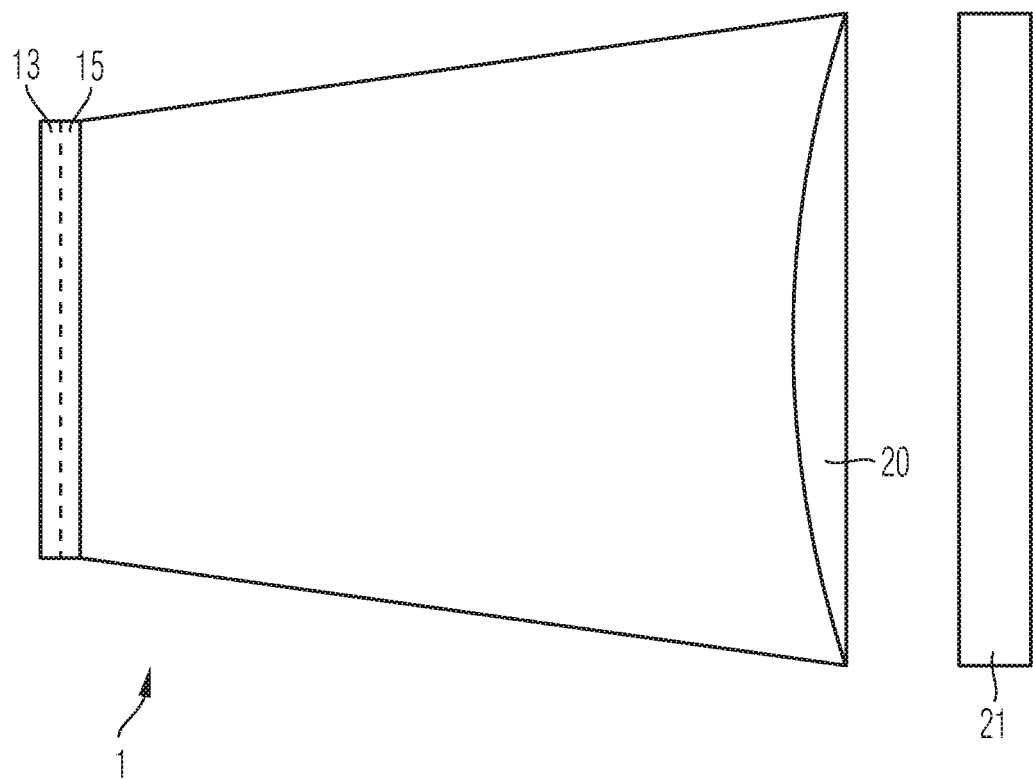
FIG. 26 schematically shows a detail of a vertical cross section of a spotlight according to one or more embodiments.

To form and/or assist the mixing functionality of the light mixing tube 17, the light mixing tube 17 can have internal depressions 171 extending axially and longitudinally, as illustrated in FIG. 25. In other embodiments, the light mixing tube 17 has a polygonal cross-sectional profile, for example, hexagonal, as illustrated in FIG. 24. The material of the light mixing tube 17 facing into the interior of the light mixing tube 17 can comprise, for example, a silver, for example, an Alanod-Miro-Silver®.

Further embodiments of the spotlight 1 are illustrated in FIGS. 20 to 23. According to the exemplary embodiment as per FIG. 20, the light mixing tube 17 is essentially cylindrical. In this embodiment, in which a field lens arrangement 20 is not provided, the spotlight 1 outputs telecentric light, for example, wherein the aperture angle of the output light differs hardly or not at all from the exit angle on the primary lens arrangement 15 (for example, less than +/−35° therein). According to the exemplary embodiment as per FIG. 21, in which a field lens arrangement 20 is not provided, a cross-sectional area of the light mixing tube 17 decreases in the light guiding direction, so that hypercentric light can be output at an enlarged light exit angle. According to the exemplary embodiment as per FIG. 22, in which a field lens arrangement 20 is not provided, the cross-sectional area of the light mixing tube 17 increases in the light guiding direction, so that it is possible to output homocentrically with a smaller light exit angle. The cross-sectional area of the light mixing tube 17 also increases in the light guiding direction according to the exemplary embodiment as per FIG. 23, wherein the field lens arrangement 20 is additionally provided, so that hypercentric light having a smaller light exit angle can be output.

One or more of the above-described embodiments enable the construction of a compact and lightweight spotlight, which is also high-performance with respect to luminosity and luminous flux, and which can additionally be produced cost-effectively. The above-described light source arrangement 13 having the primary lens arrangement 15 can be used as a platform for a variety of different spotlights, for example, the above-described spotlight having the plurality of light guides, which protrude into a reflector interior, for a Fresnel spotlight and/or for a tracking spotlight.

Spatial location terms, for example, "below", "above", "low", "over", "top", "upstream", "downstream", and the like are used to simplify the description, in order to clarify the positioning of the point of one element in relation to a second element. These terms are intended to include different orientations of the respective device in addition to orientations other than those shown in the figures. Furthermore, terms such as, for example, "first", "second", and the like are also used to describe various elements, regions, subsections, etc. and are also not to be understood as restrictive. Similar terms relate to similar elements throughout the entire description.

As used herein, the terms "having", "containing", "including", "comprising", and the like are open terms which indicate the presence of listed elements or features, but do not exclude additional elements or features. The articles "a/one" and "the" are to be understood to mean that they comprise the plural and also the singular, if the context does not unambiguously indicate otherwise.

In in consideration of the above range of variations and applications, it is to be noted that the present invention is not restricted by the preceding description and is also not restricted by the appended drawings. Rather, the present invention is solely restricted by the following claims and the legal equivalents thereof.

The invention claimed is:

1. A spotlight for illuminating a film, studio, stage, event, and/or theatre environment, comprising:
   a reflector arrangement having a reflective inner surface, which delimits a reflector interior; and
   a number of passive light guides having feed points, which are arranged outside the reflector interior, and having light output points, which are arranged inside the reflector interior, wherein the light output points of the passive light guides are oriented at different angles with respect to each other.

2. A spotlight according to claim 1, furthermore comprising an electrically operated light source arrangement, which is arranged outside the reflector interior and is designed to generate light and feed it in at the feed points of the passive light guides.

3. A spotlight according to claim 2, wherein the light source arrangement has a support, on the front side of which LEDs are arranged, which generate the light.

4. A spotlight according to claim 3, wherein the LEDs or subgroups thereof are electrically connected to one another via a number of current paths.

5. A spotlight according to claim 4, wherein the current paths are also arranged on the front side of the support and/or wherein the current paths each have a wedge-shaped profile, the tip of which points essentially into the centre of the front side.

6. A spotlight according to claim 3, comprising:
   LEDs having first LEDs of a first colour and second LEDs of a second colour, which are each installed on the front side of the support;
   wherein:
   the front side has a structure pattern, which is formed from a plurality of adjoining hexagonal cells of equal size; and
   each of the LEDs is arranged in a separate hexagonal cell.

7. A spotlight according to claim 6, wherein the geometrical centre point of the distribution of the first LEDs and the geometrical centre point of the distribution of the second LEDs are coincident with the centre point of the front side.

8. A spotlight according to claim 3, furthermore comprising:
   a primary lens arrangement, which is positioned at a distance between 50 μm and 1 mm from the LEDs, wherein the primary lens arrangement comprises at least one lens element for each of the LEDs.

9. A spotlight according to claim 8, wherein the primary lens arrangement is designed to output at least 70% of the light generated by the LEDs in a light cone having an aperture angle of less than 35°.

10. A spotlight according to claim 8, wherein the lens elements are installed on the front side of a support of the primary lens arrangement facing away from the front side of the support, and wherein
    the front side of the support has a structure pattern, which is formed from a plurality of adjoining hexagonal cells of equal size;
    each of the lens elements is arranged in a separate hexagonal cell.

11. A spotlight according to claim 1, wherein the reflective inner surface of the reflector arrangement is formed in the manner of a truncated cone growing in diameter in the direction of the light exit or similar to a paraboloid.

12. A spotlight according to claim 1, wherein the reflector arrangement is a curved reflector and/or the light guides are each formed rod-shaped.

13. A spotlight according to claim 1, wherein the light guides penetrate the inner surface of the reflector arrangement.

14. A spotlight according to claim 1, wherein the passive light guides are arranged along an imaginary circle and the longitudinal extensions are each oriented perpendicularly in relation to the peripheral profile of the imaginary circle.

15. A spotlight according to claim 1, wherein the light output points are arranged concentrically in relation to the inner surface of the reflector arrangement.

16. A spotlight according to claim 1, wherein the passive light guides each have a polygonal cross section.

17. A spotlight according to claim 1, wherein the light output points of the passive light guides are formed by an essentially planar light guide terminus face is oriented at an angle of less than 30° to the longitudinal extension of the respective light guide.

18. A spotlight according to claim 1, furthermore comprising a pre-reflector (116), which is arranged between the light output points of the passive light guides and the base of the reflector arrangement.

19. A spotlight according to claim 1, furthermore comprising a lens arrangement arranged in the reflector interior having at least two lens elements oriented concentrically in relation to one another, which can optionally be arranged movably in relation to one another.

20. A spotlight according to claim 19, wherein the lens elements are formed as diffusion lenses, and/or wherein the lens elements each have a wavy structure, wherein, optionally, the wavy structures can be provided on the inner surfaces of the diffusion lenses.

* * * * *